US006282773B1

(12) United States Patent
Luttrell

(10) Patent No.: US 6,282,773 B1
(45) Date of Patent: Sep. 4, 2001

(54) APPARATUS FOR PRODUCING WINDING SLOT INSULATORS AND INSERTING SAME INTO THE STATOR CORE OF AN ELECTROMECHANICAL MACHINE

(75) Inventor: C. W. Luttrell, Loganville, GA (US)

(73) Assignee: Rockwell Technologies, LLC, Thousand Oaks, CA (US)

( * ) Notice: Subject to any disclaimer, the term of this patent is extended or adjusted under 35 U.S.C. 154(b) by 0 days.

(21) Appl. No.: 09/409,519

(22) Filed: Sep. 30, 1999

(51) Int. Cl.$^7$ .................................................. H02K 15/10
(52) U.S. Cl. ...................... 29/564.6; 29/564.8; 29/596; 29/734; 493/949
(58) Field of Search ............................... 29/596, 598, 734, 29/736, 564.6, 564.8; 493/949

(56) References Cited

U.S. PATENT DOCUMENTS

| | | | |
|---|---|---|---|
| 3,514,836 | * | 6/1970 | Mason ................................ 29/734 X |
| 3,909,902 | * | 10/1975 | Peters .................................. 29/564.6 |
| 4,878,292 | * | 11/1989 | Santandrea et al. .................... 29/734 |

* cited by examiner

*Primary Examiner*—Carl E. Hall
(74) *Attorney, Agent, or Firm*—Craig N. Killen; William R. Walburn; Alexander M. Gerasimow

(57) ABSTRACT

Insulating slot liners for insertion into stator core winding slots are formed from a narrow-width reel of insulating material. The width of the material is determined by the inner circumferential surface of the winding slot that must be insulated, instead of being based on the axial length of the stator core as has been the practice in the past. As a result, slot liners may be easily produced for stator cores of different axial lengths by simply adjusting the length of material cut from the reel. Preferably, the cutting mechanism used to cut the length of material is adapted to form a pair of opposed cuffs when the material is cut. An insulator blank formed in this manner is pushed into a die, thereby forming a U-shaped slot liner. A transfer mechanism functions to move the slot liner into a respective winding slot. The slot liner preferably passes through a reduced diameter guideway defined in a guide element as it is moved into the winding slot. The guide element is adapted to be retracted from its operative position after insertion of the slot liner so that the stator core can be indexed to the next slot position.

12 Claims, 10 Drawing Sheets

APPARATUS FOR PRODUCING WINDING SLOT INSULATORS AND INSERTING SAME INTO THE STATOR CORE OF AN ELECTROMECHANICAL MACHINE

BACKGROUND OF THE INVENTION

The present invention relates generally to the manufacture of electromechanical machines, such as electric motors. More particularly, the invention relates to an improved method and apparatus for producing slot insulators and inserting same into the stator core of an electromechanical machine.

Electric motors and other electromechanical machines are generally constructed having a cylindrical stator core. The inner circumference of the stator core defines a plurality of radial slots in which electrical windings are maintained. A slot insulator, typically referred to as a "slot liner," is located on the inner circumferential surface of each winding slot in order to electrically isolate the windings from the stator core.

During the manufacturing process, individual slot liners are typically inserted into the respective winding slots using automated equipment designed for this purpose. The slot liners themselves have been formed from a roll of insulator material having a width dictated by the axial length of the stator core in which the slot liners are to be inserted. To form individual slot liners, a quantity of material is first drawn from the roll. The material is then cut to a length equivalent to the inner circumferential portion of the winding slot to be insulated. End cuffs are passively formed along the sides of the insulator material as it is pulled from the roll.

For example, consider a stator core having an axial length of 5" and in which each winding slot has an inner circumferential portion of 1.5" to be insulated. According to the prior art described above, it is necessary to use a roll of insulator material having a width of greater than 5" in order to produce slot liners for this core. The insulator material is drawn from the roll, and cut into 1.5" lengths. The insulator blank formed in this manner is bent into a U-shaped slot liner and moved axially into a respective slot.

Typically, a face plate is utilized for slot liner insertion. The face plate defines a plurality of guides in the pattern of the stator core's winding slots. The guides are maintained in register with the end of the stator core as it is indexed to receive the next slot liner.

While the prior art has worked generally well to achieve the formation and insertion of slot liners, it is not without disadvantages. For example, multiple stator lengths may be offered within a single motor size. Thus, it is necessary to maintain in stock rolls of each width that will be required to produce slot liners for all of the various stator lengths.

In addition, the face plate used for slot liner insertion is a relatively complex and expensive part. Moreover, the face plate has a tendency to "grip" the slot liners, often causing the slot liners to be pulled partially from the slots as the stator core is removed from the face plate. When this happens, the slot liners must be manually reinserted into the winding slots.

SUMMARY OF THE INVENTION

The present invention recognizes and addresses the foregoing disadvantages, and others, of prior art constructions and methods. Accordingly, it is an object of the present invention to provide novel methodology for the production of winding slot insulators.

It is a more particular object of the present invention to provide novel methodology by which winding slot insulators may be produced from an elongate strip of insulator material.

It is also an object of the present invention to provide a novel apparatus for the production of winding slot insulators.

It is a further object of the present invention to provide a novel apparatus for the insertion of winding slot insulators.

Some of these objects are achieved by a method of forming and inserting a winding slot insulator in a winding slot defined in a stator core. The method involves providing an elongate strip of slot insulator material having a predetermined width equivalent to an inner circumferential portion of the winding slot to be insulated. Based on the axial length of the stator core, a predetermined length of the slot insulator material is separated from the strip to provide an insulator blank. The insulator blank is formed into a U-shaped slot insulator and inserted into a selected winding slot of the stator core.

The method may further comprise the step of forming cuffs at both axial ends of the insulator blank before the U-shaped slot insulator is formed. For example, the cuffs may be formed at a trailing end of the insulator blank and a leading end of the remaining elongate strip. According to exemplary methodology, the cuffs may be produced by vertically-moving cuff pushers operating adjacent to a cutting blade.

Preferably, the U-shaped slot insulator is inserted axially into the selected winding slot through a guide element presenting a reduced dimension guideway. Often, it will be desirable to move the guide element to a location adjacent to the selected winding slot prior to insertion of the U-shaped slot insulator.

Other objects of the present invention are achieved by an apparatus for forming and inserting a winding slot insulator in a winding slot defined in a stator core. The apparatus comprises a reel support adapted to maintain a reel of slot insulator material having a predetermined width. A feed mechanism is operative to deliver a quantity of the slot insulator material from the reel to a cutting station.

The apparatus includes a cutting mechanism located at the cutting station. The cutting mechanism is operative to cut through the slot insulator material to provide an insulator blank having cuffs at respective ends thereto. The insulator blank is received in a die mechanism operative to form the insulator blank into a U-shaped slot insulator. A transfer mechanism is operative to insert the U-shaped slot insulator into the winding slot.

In some exemplary embodiments, the cutting mechanism includes a cutting blade having first and second cuff pushers located on each side thereof. The cuff pushers are operative to form a respective cuff on a trailing end of the insulator blank and a leading end of the quantity of insulator material. Often, the cutting blade and the cuff pushers will be operative to move together from opposite sides of the insulator material.

The apparatus may further comprise a retractable guide element movable to an operative position adjacent to the winding slot to present a reduced dimension guideway through which the U-shaped slot insulator is inserted. Often, the guideway of the retractable guide element may be formed by plural components that converge together as the guide element is moved into the operative position.

Preferably, the die mechanism will be situated in longitudinal alignment with the cutting station for receipt of the insulator blank therein. In such cases, the die mechanism may be operative to move laterally from a first position aligned with the cutting station to a second position aligned with the winding slot.

Still further objects of the present invention are achieved by an apparatus for forming and inserting a winding slot insulator in a winding slot defined in a stator core. The apparatus comprises a feed mechanism operative to deliver a quantity of slot insulator material to a cutting station. A cutting mechanism is located at the cutting station, and is operative to cut through the slot insulator material to provide an insulator blank having a predetermined length. The insulator blank is received in a die mechanism operative to form the insulator blank into a U-shaped slot insulator. A transfer mechanism is operative to insert the U-shaped slot insulator into the winding slot. A retractable guide element, movable to an operative position adjacent to the winding slot, is also provided. The guide element presents a reduced dimension guideway through which the U-shaped slot insulator is inserted.

Additional objects of the present invention are achieved by an apparatus for forming a cuffed insulator blank from an elongate strip of insulator material. The apparatus comprises a reel support adapted to maintain a reel of slot insulator material having a predetermined width. A feed mechanism is operative to deliver a quantity of the slot insulator material from the reel to a cutting station. A cutting mechanism located at the cutting station is operative to cut through the slot insulator material to provide an insulator blank of predetermined length. The cutting mechanism is further operative to form a respective cuff on a trailing end of the insulator blank and a leading end of the quantity of insulator material.

Further objects of the present invention are achieved by an apparatus for inserting a winding slot insulator in a winding slot defined in a stator core. The apparatus comprises a cutting mechanism operative to cut an insulator blank from a longitudinal strip of slot insulator material. The insulator blank is received in a die mechanism operative to form the insulator blank into a U-shaped slot insulator. A transfer mechanism is operative to insert the U-shaped slot insulator into the winding slot. A retractable guide element is also provided, movable to an operative position adjacent to the winding slot. The guide element presents a reduced dimension guideway through which the U-shaped slot insulator is inserted.

Other objects, features and aspects of the present invention are provided by various combinations and subcombinations of the disclosed elements, and methods of practicing same, which are discussed in greater detail below.

BRIEF DESCRIPTION OF THE DRAWINGS

A full and enabling disclosure of the present invention, including the best mode thereof, to one skilled in the art, is set forth more particularly in the remainder of the specification, including reference to the accompanying drawings, in which.

Figure 1:
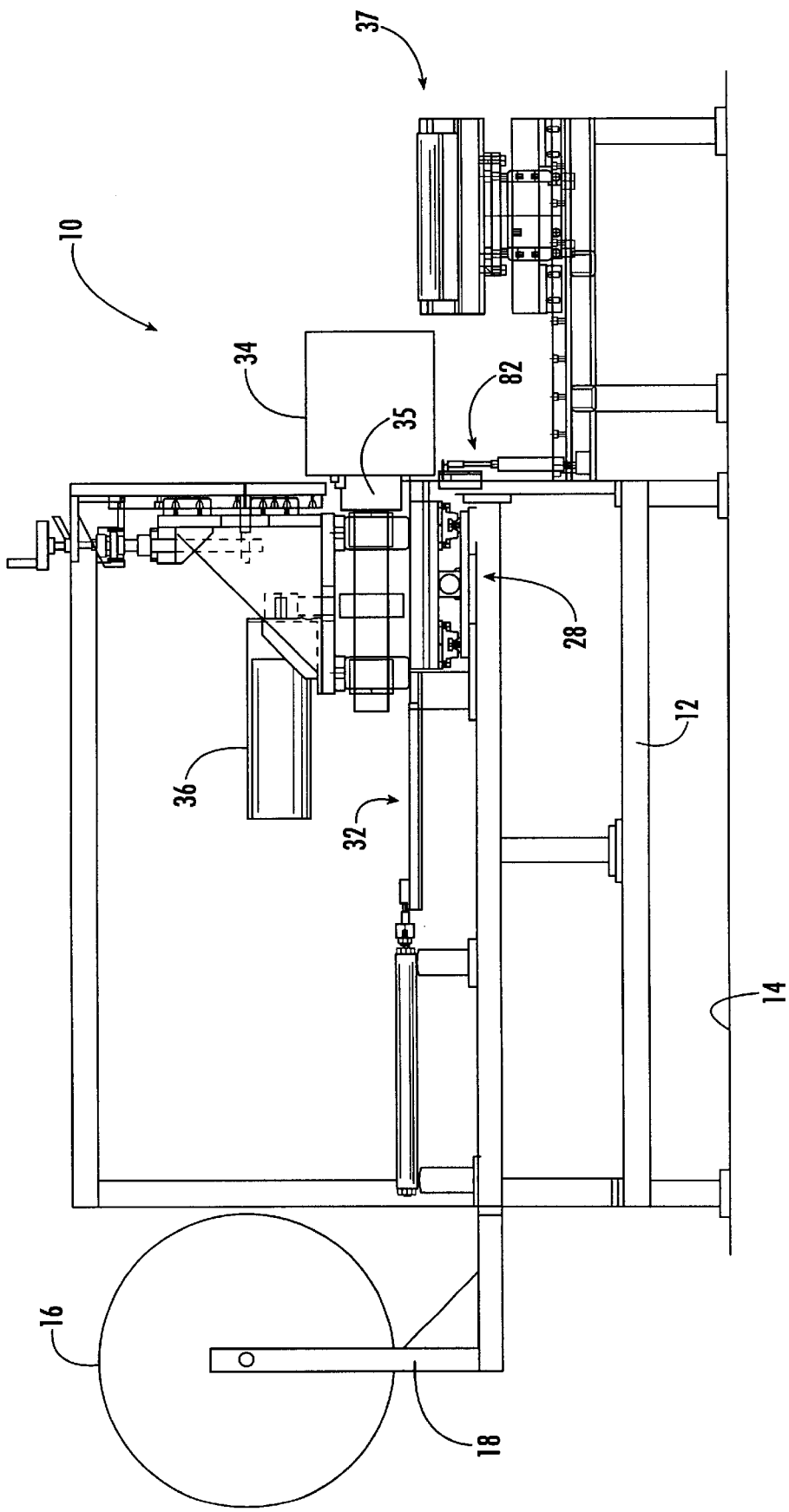
FIG. 1 is a side elevation of an apparatus constructed in accordance with the present invention for forming and inserting winding slot insulators.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

As discussed above, winding slot liners have been made in the prior art by providing a roll of material having a width based on the axial length of the stator core. Within a motor size, it has thus been necessary to stock a different roll of insulator material for each stator length in which the motor is offered. The present invention eliminates the need to stock multiple rolls of different widths for each stator length. Instead, a single reel is provided having a width defined by the inner circumferential portion of the winding slots that must be insulated.

According to the present invention, slot liners are formed by cutting the reel into lengths determined by the axial length of a particular stator core. For example, the reel of material may be cut into six-inch lengths to form slot liners for a five-inch core. A typical material width in such an example may be 1.5 inches in order to insulate the inner circumferential portion of the winding slot.

Figure 2:
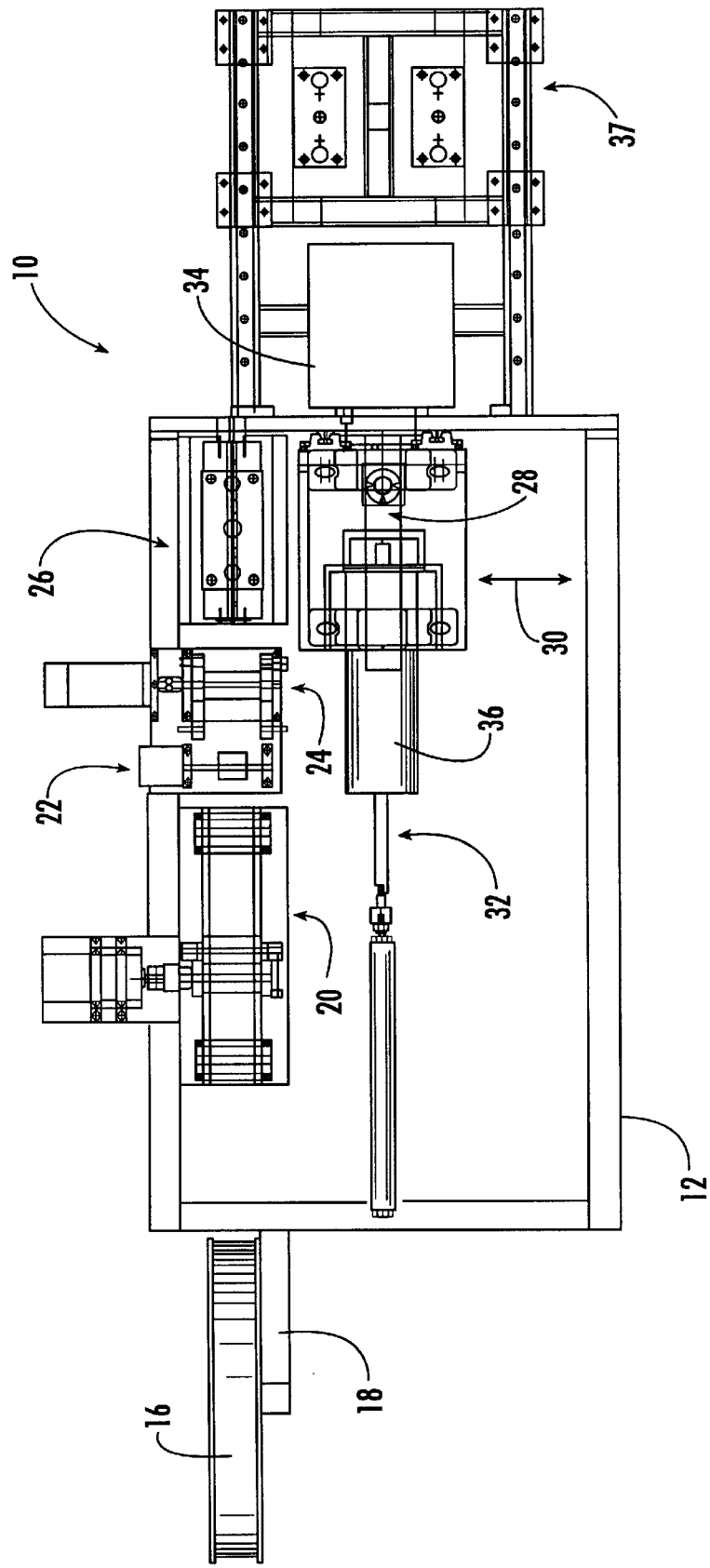
FIG. 2 is a top elevation of the apparatus of FIG. 1.
Figure 3:
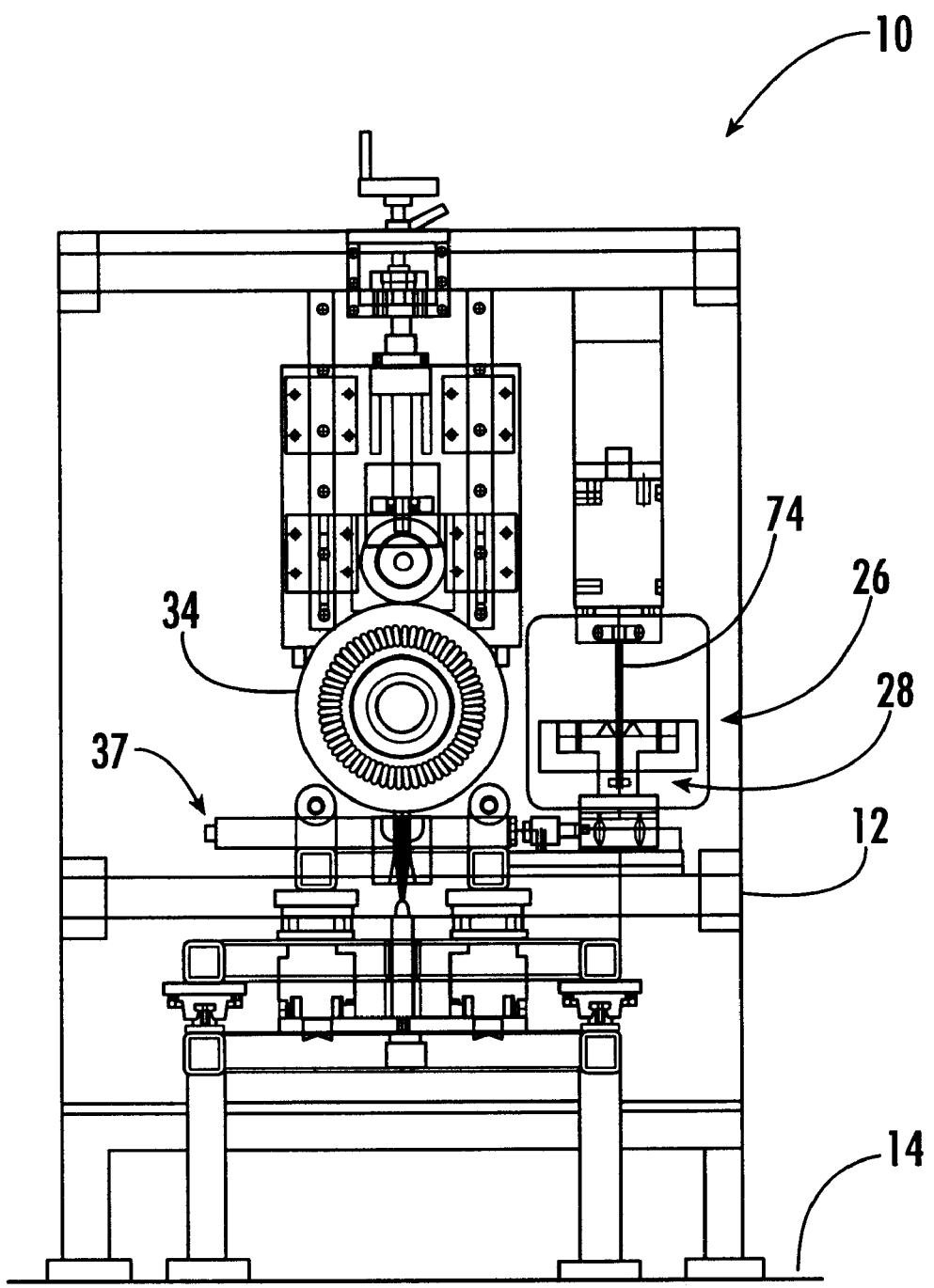
FIG. 3 is an end elevation of the apparatus of FIG. 1.

Referring now to FIGS. 1–3, an apparatus 10 for forming and inserting slot liners in accordance with the present invention is illustrated. As shown, apparatus 10 includes a frame 12 resting on floor 14. A reel 16 comprising an elongate strip of insulator material is maintained on an upstanding reel support 18 extending from frame 12. The insulator material is drawn from reel 16 as necessary in the production of individual slot liners.

The strip of insulator material preferably passes through a prefeed section 20 having a plurality of tensioning loops. The material then passes through an encoder 22 which determines the length of material that has been metered from the reel. A drive roller 24 is provided to advance the strip of insulator material into a cutting station 26.

As will be explained more fully below, cutting station 26 includes a cutting mechanism that serves to cut an insulator blank from the strip of insulator material. In presently preferred embodiments, the cutting mechanism also forms retaining cuffs at each end of the insulator blank. The insulator blank is next passed to a die mechanism 28 located, at this time, directly below a portion of cutting station 26 in axial alignment therewith. In die mechanism 28, the insulator blank is formed into a U-shaped slot liner.

After the U-shaped slot liner is formed, die mechanism 28 shifts laterally, as indicated by arrow 30, to a position aligned with transfer mechanism 32. As can be seen in FIGS. 1 and 3, a stator core 34 is carried by an indexing arbor 35 so that a particular winding slot will also be axially aligned with transfer mechanism 32. Transfer mechanism 32 pushes the slot liner from the die of mechanism 28 into the aligned winding slot. A drive 36 then operates to angularly index stator core 34 so that another winding slot will be presented for receipt of the next slot liner. A suitable cradle 37 is provided to support stator core 34 while it is loaded and unloaded from arbor 35.

Figure 4:
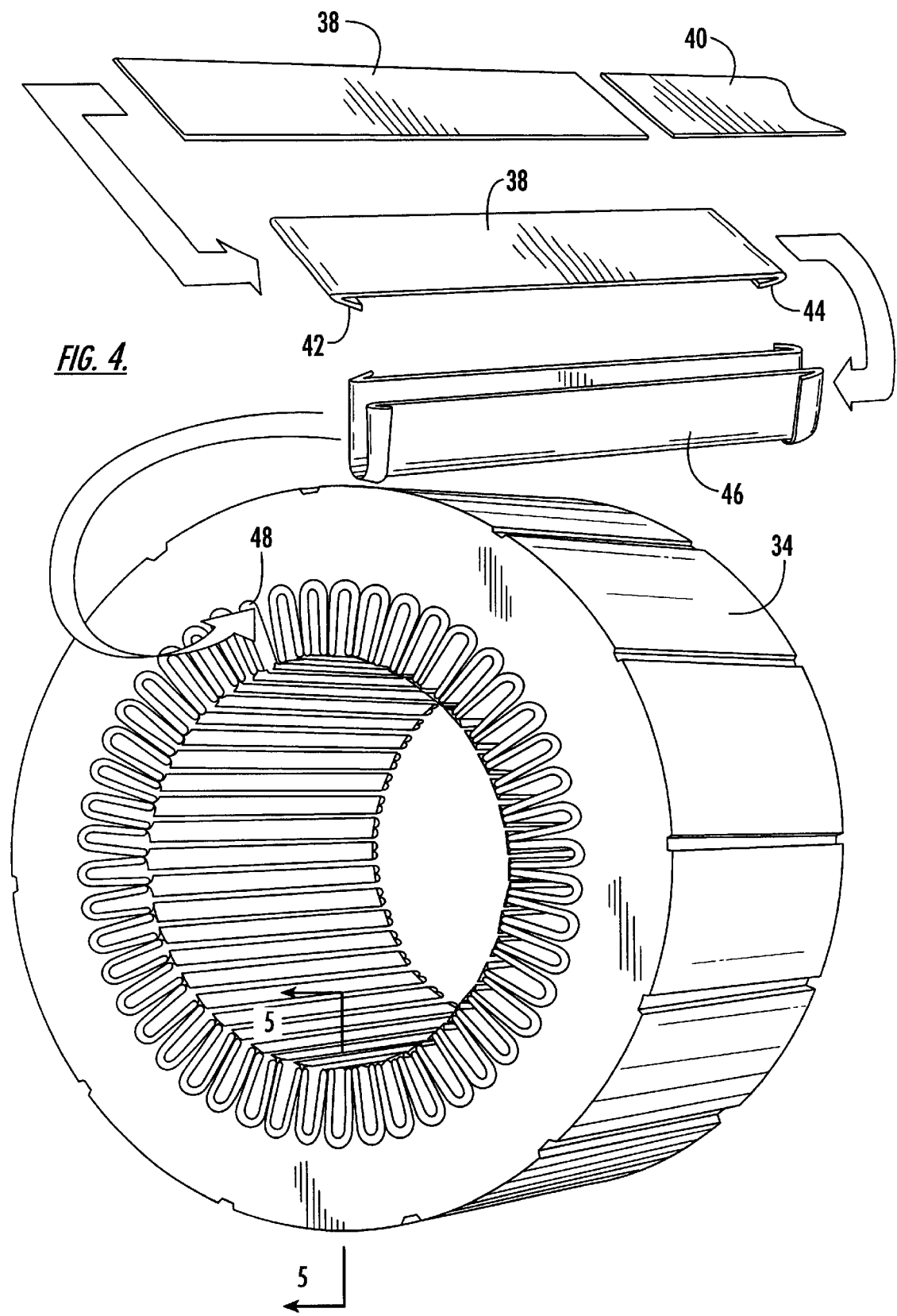
FIG. 4 is a perspective view of a stator core diagrammatically illustrating the insertion of winding insulators into respective slots thereof according to the present invention.

The methodology performed by apparatus 10 is diagrammatically illustrated in FIG. 4. As shown, an insulator blank 38 is severed from an elongate strip 40 of insulator material being fed from the reel. Retaining cuffs 42 and 44 are produced at each end of insulator blank 38. After insulator blank 38 is formed into U-shaped slot liner 46, it is axially inserted into a respective winding slot 48.

Figure 5:
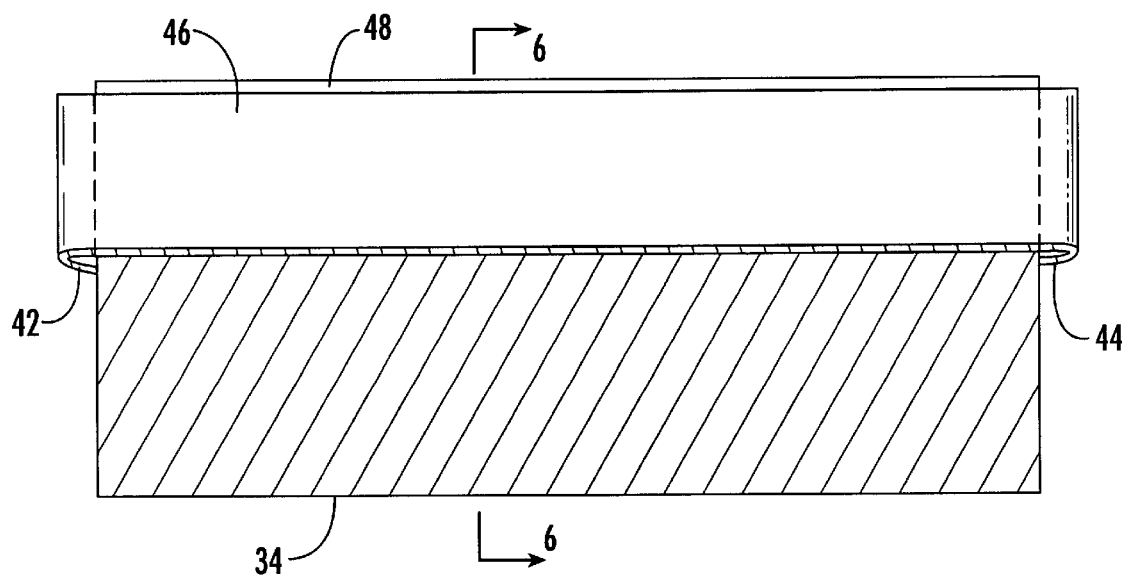
FIG. 5 is a cross-sectional view as taken along line 5–5 of FIG. 4.
Figure 6:
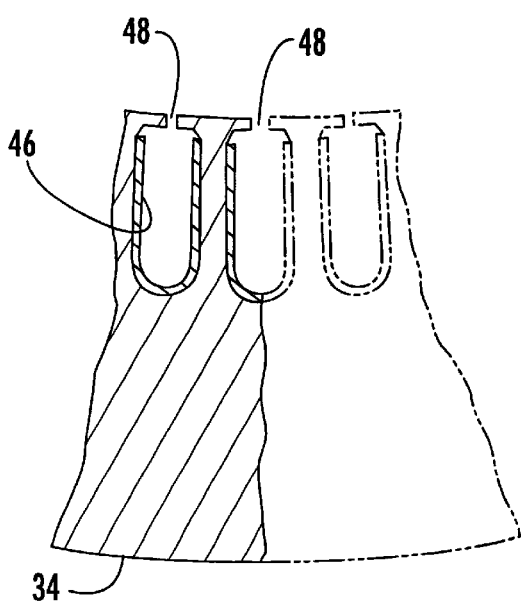
FIG. 6 is a cross-sectional view as taken along line 6–6 of FIG. 5.

FIGS. 5 and 6 illustrate slot liner 46 after it has been installed in winding slot 48. As shown, cuffs 42 and 44 engage the respective end faces of stator core 34. This will tend to prevent slot liner 46 from sliding out of slot 48 during other steps in the manufacturing process, such as the insertion of winding coils. As can be most clearly seen in FIG. 6, the width of material used to form blank 38 is determined by the inner circumferential surface of slot 48 that must be insulated.

Figure 7:
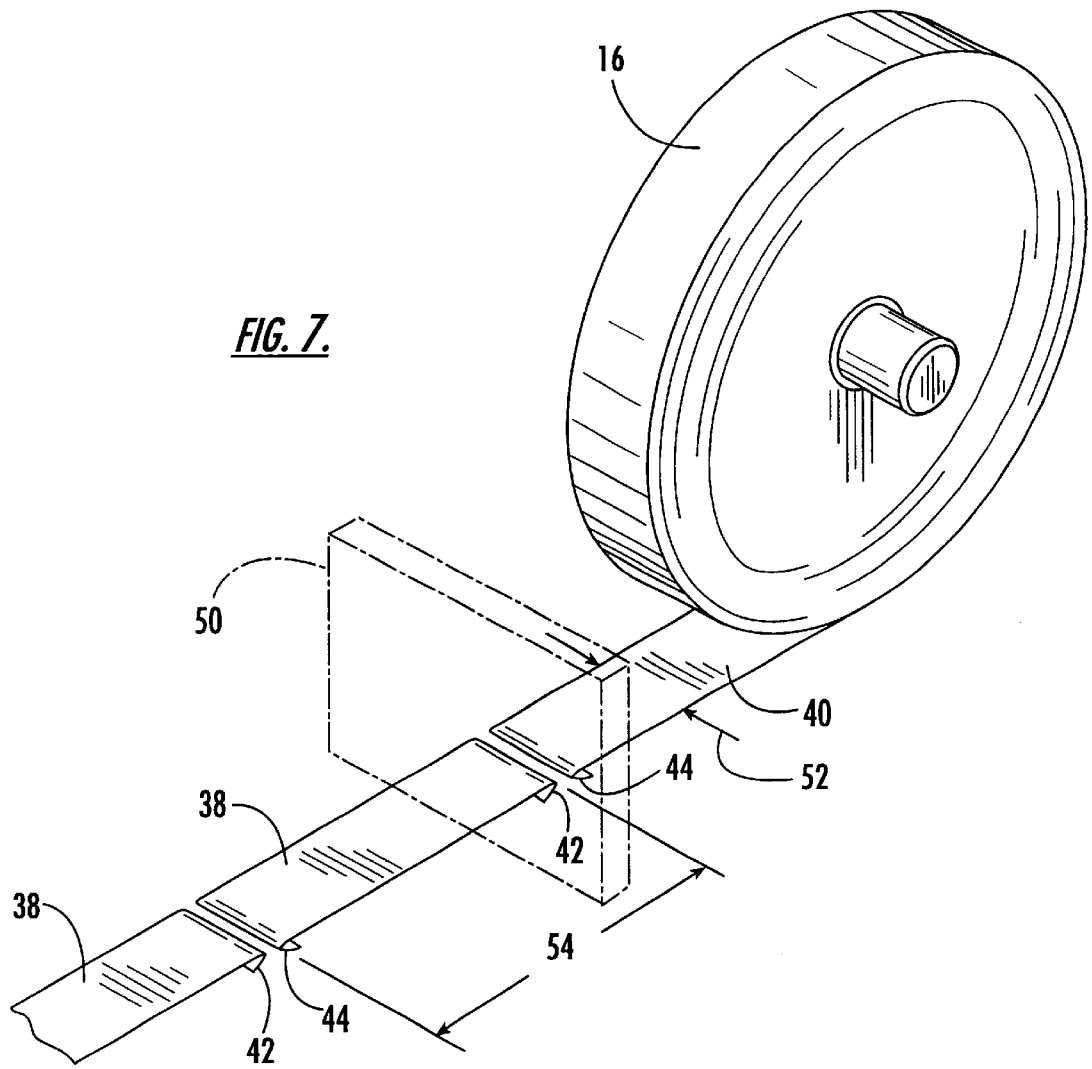
FIG. 7 is a perspective view of a reel of insulator material diagrammatically showing the manner in which insulator blanks are cut therefrom.

FIG. 7 diagrammatically illustrates the operation of a preferred cutting mechanism 50 located at the cutting station of apparatus 10. As shown, cutting mechanism 50 not only severs insulator blank 38 from strip 40, but also produces opposing cuffs at the location of the cut. In other words, cuff 44 is formed at the leading end of strip 40, while cuff 42 is formed at the trailing end of blank 38. Strip 40 is then advanced so that the next blank 38 can be cut.

The relevant width and length dimensions of blank 38 can also be easily seen in FIG. 7. As noted above, the width dimension (indicated at 52) is defined by the portion of the winding slot's inner circumferential surface that must be insulated. The length dimension (indicated at 54) of each blank 38 is determined by the axial length of the stator core in which the slot liners will be inserted. Length 54 is thus the length of the stator core in which the slot liner will be inserted, plus the length necessary to provide cuffs 42 and 44.

It will be appreciated that stator cores of different axial lengths within a single motor size can be easily accommodated by simply adjusting the predetermined length 54 at which the insulator blanks 38 are cut. This adjustment can be programmed into the controller software of apparatus 10, thus permitting changeover to a different stator length without the need to make complex mechanical adjustments. This is in contrast to the prior art, where it was necessary to change the roll of insulator material to a different width with each change of stator length.

Figure 8A:
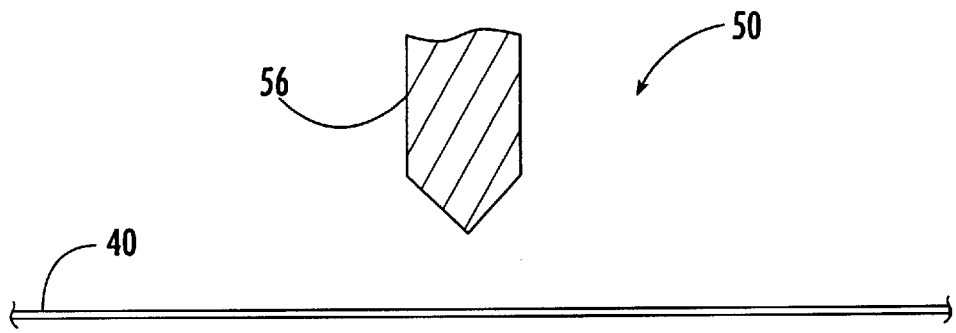
FIGS. 8A through 8D illustrate the operation of a preferred cutting mechanism for cutting insulator blanks from a longitudinal strip of insulator material.

Further details regarding the operation of cutter mechanism 50 can be easily described with reference to FIGS. 8A–8D. In FIG. 8A, a quantity of elongate strip 40 has been pulled into the cutting station in position to be cut. As can be seen, cutting mechanism 50 includes a cutting blade 56 located above strip 40. A pair of cuff pushers 58 and 60 are located below elongate strip 40. As shown, respective cuff blocks 62 and 64 are located adjacent to cuff pushers 58 and 60.

Figure 8B:
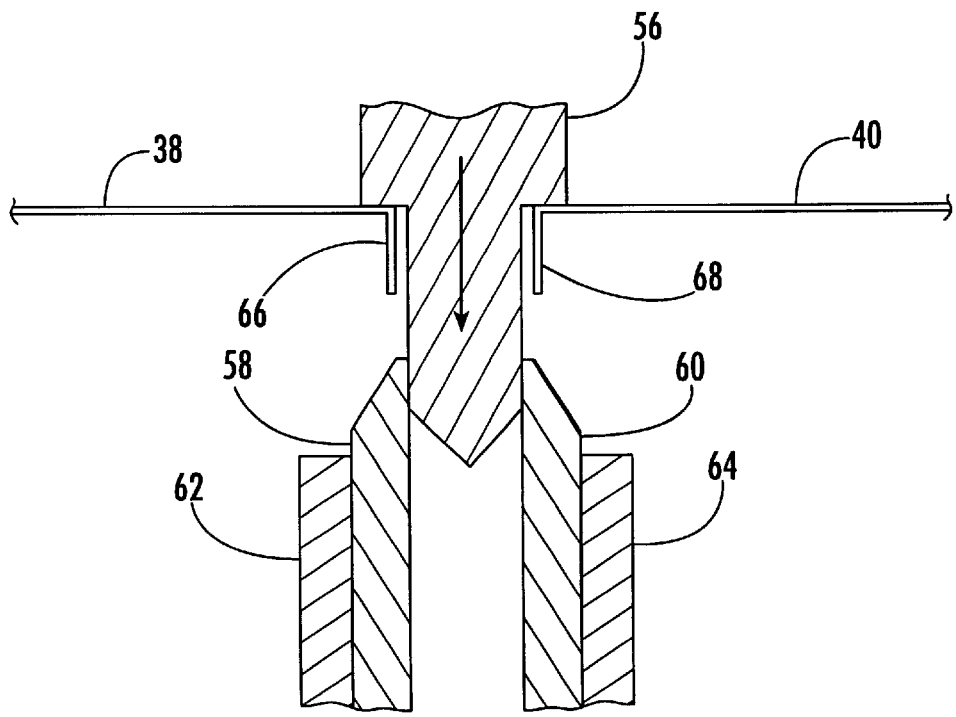

Referring now to FIG. 8B, cutting blade 56 has been moved in a downward vertical direction, thus severing elongate strip 40. Strip 40 is suitably supported to produce respective folds 66 and 68 located at the trailing end of insulator blank 38 and the leading end of strip 40.

Figure 8C:
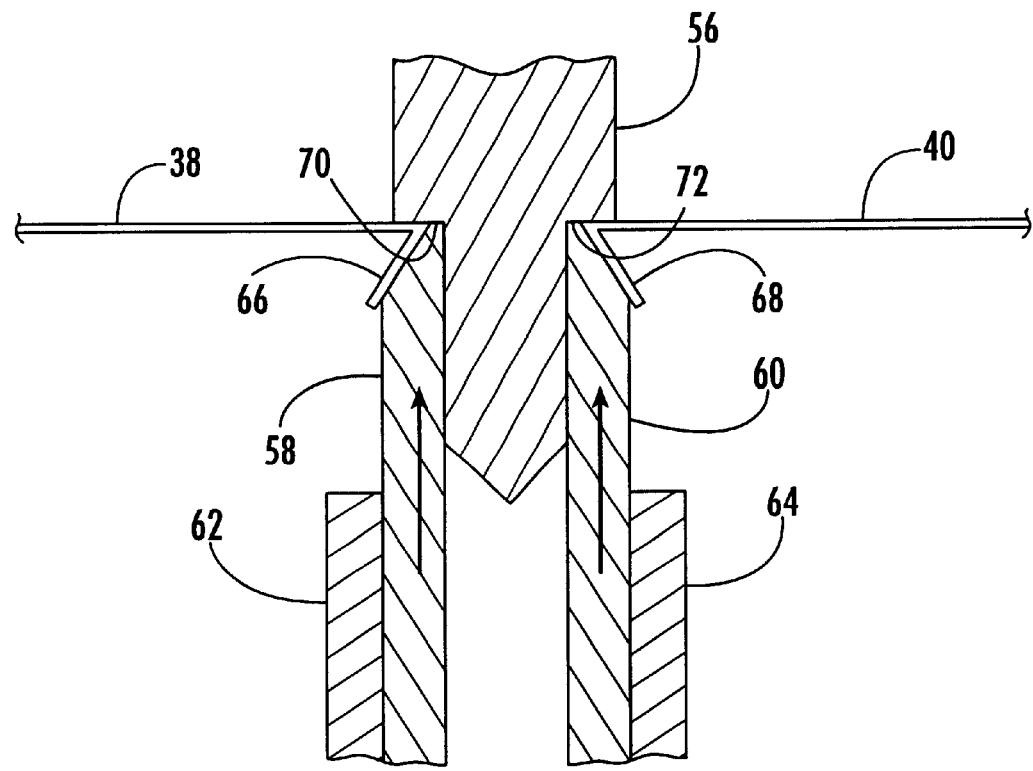

As illustrated in FIG. 8C, cutting blade 56 remains in the downward position while cuff pushers 58 and 60 move upward against folds 66 and 68. As a result, folds 66 and 68 are engaged by the tapered surfaces located at the respective upper portion of cuff pushers 58 and 60. Preferably, cutting blade 56 defines step portions 70 and 72 opposing the respective cuff pushers 58 and 60. Step portions 70 and 72 hold down insulator blank 38 and elongate strip 40 so that a good crease can be achieved.

Through the use of cutting mechanism 50, cuffs 42 and 44 are formed actively (as opposed to passive forming techniques of the prior art). As a result, cuffs 42 and 44 will possess excellent memory characteristics to facilitate shape retention during subsequent steps in the manufacturing process.

Figure 8D:
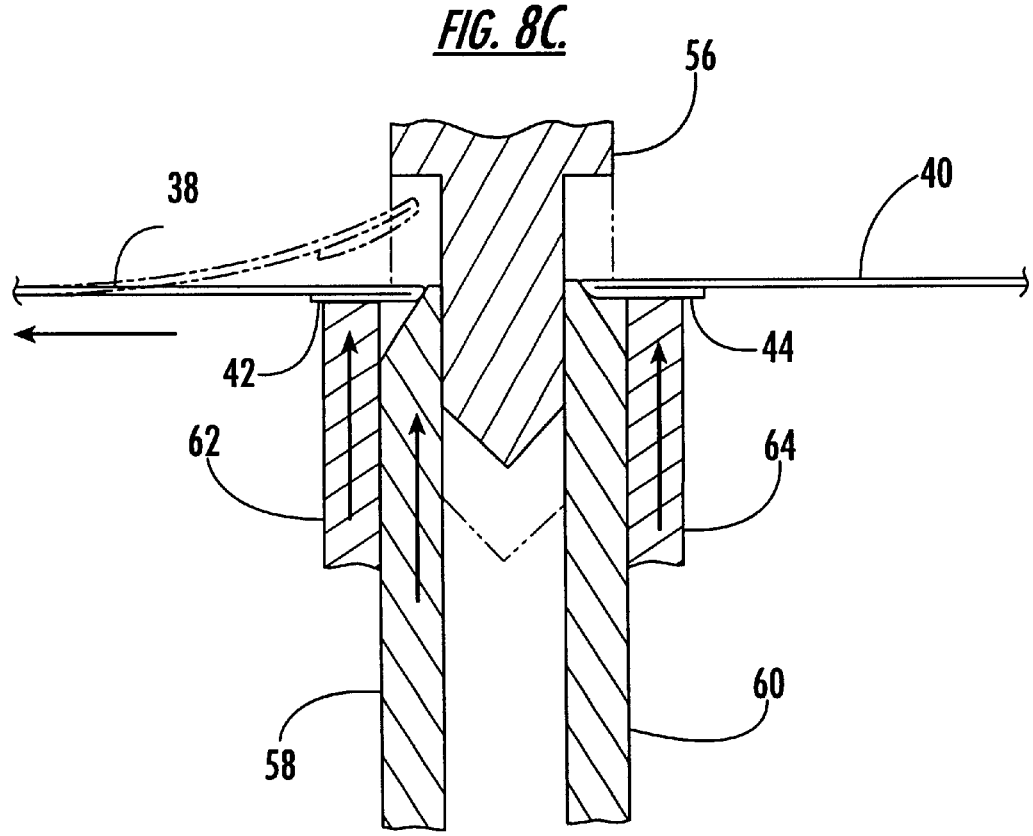

Referring now to FIG. 8D, cuff blocks 62 and 64 move into position after cuffs 42 and 44 have been formed. Cutting blade 56 then moves back to its retracted position, as shown. After cutting blade 56 has been moved out of the way, cuff pusher 58 moves upward to push insulator blank 38 away from cuff block 62. Insulator blank 38 is then moved longitudinally into position above the die mechanism.

Figure 9A:
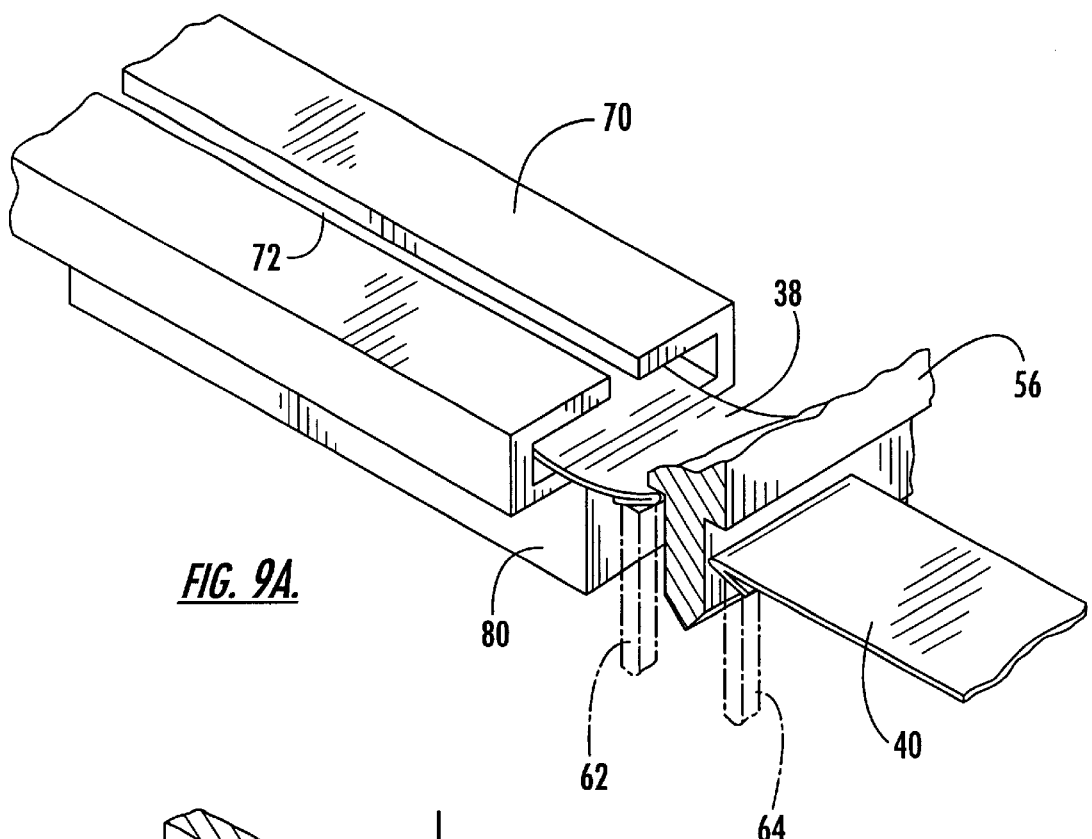
FIGS. 9A through 9D diagrammatically illustrate the manner in which an insulator blank is formed into a U-shaped slot insulator and is subsequently inserted into a winding slot.
Figure 9B:
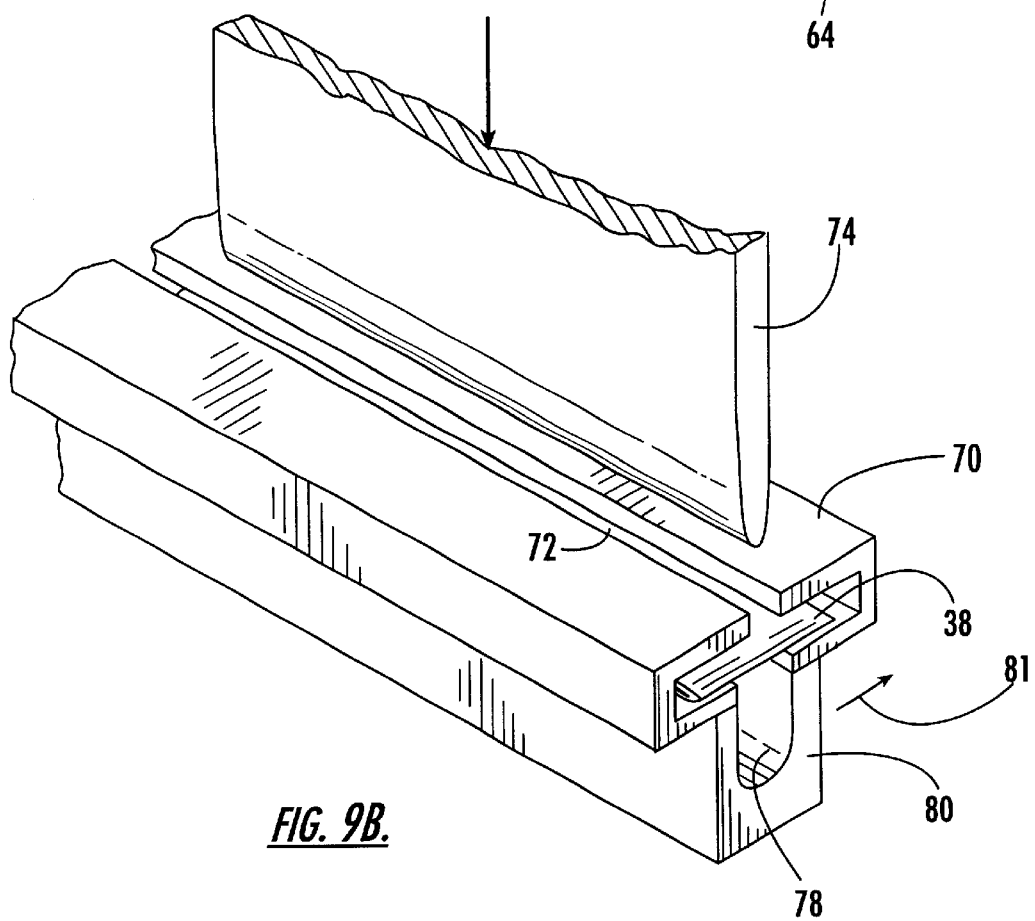

This can be seen in FIGS. 9A and 9B, where insulator blank 38 is moved into a receiving fixture 70. As shown, receiving fixture 70 has a generally rectangular cross section and defines a longitudinal slot 72 in its upper surface. A forming blade 74 moves down through slot 72, thereby pushing insulator blank 38 into a U-shaped channel 78 defined in a die 80 (part of die mechanism 28). As a result, insulator blank 38 will be desirably formed into a U-shaped slot insulator. Die 80 then moves laterally, as shown by arrow 81, so that the slot liner may be inserted into a winding slot.

Figure 9C:
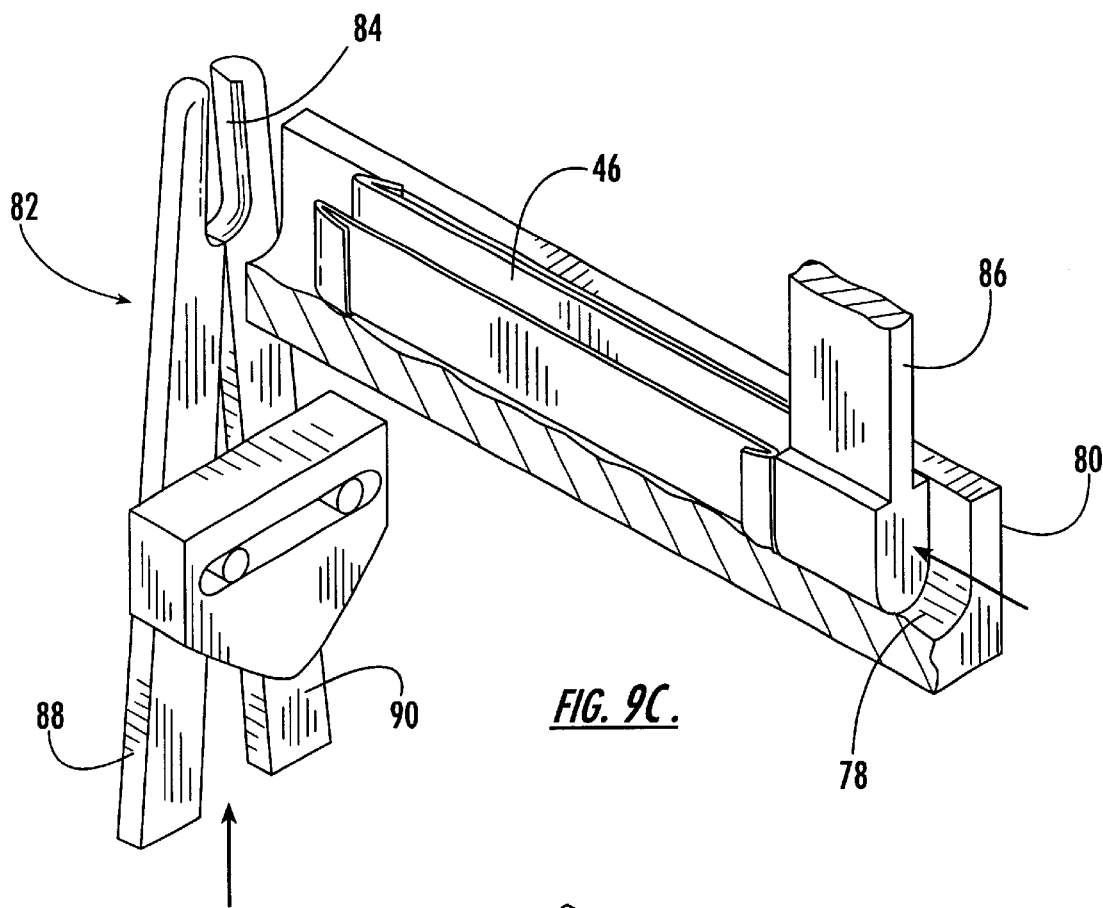
Figure 9D:
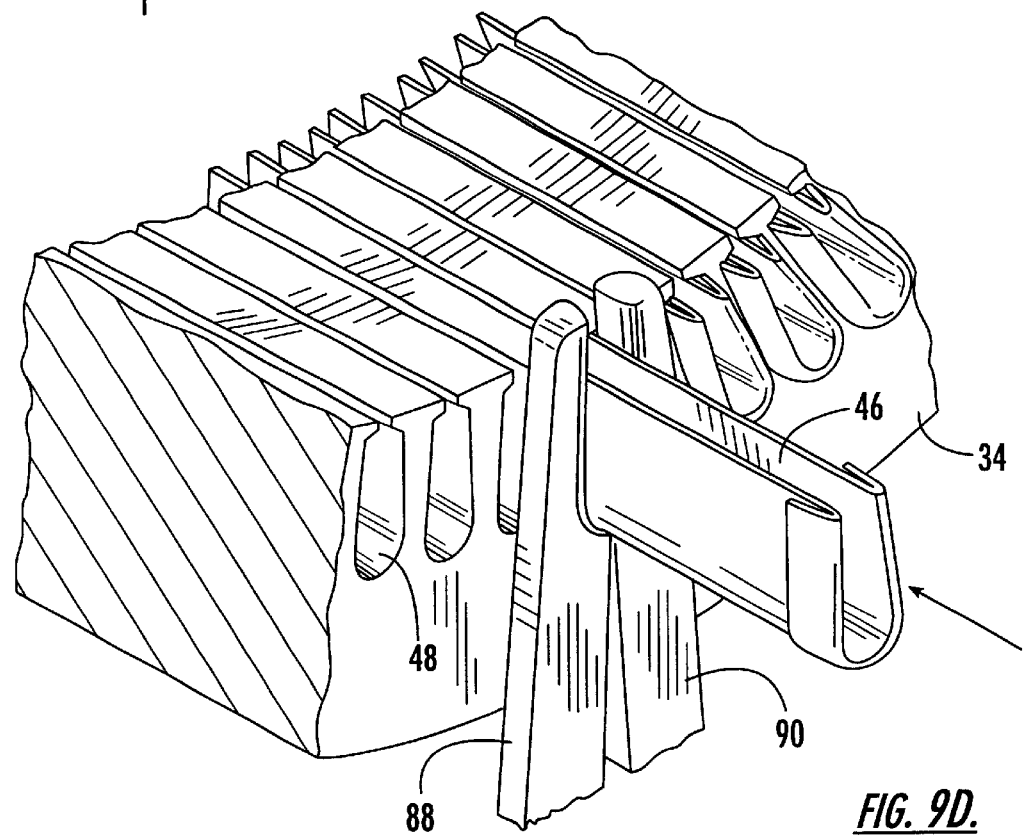

Next, as shown in FIGS. 9C and 9D, a guide element 82 preferably moves into operative position between the end of channel 78 and the winding slot. Guide element 82 provides a guideway 84 through which slot liner 46 must pass as it enters the winding slot. Because guideway 84 has a reduced dimension with respect to the winding slot, it will tend to close slot liner 46. This is advantageous in allowing easy insertion of slot liner 46, since the inside surface of a stator winding slot tends to be relatively rough. An appropriate pushing element, such as element 86, is part of transfer mechanism 32 and serves to move slot liner 46 into the winding slot.

After slot liner 46 is inserted, guide element 82 is moved down, away from the face of stator core 34. Stator core 34 can then be indexed to expose another winding slot, after which guide element 82 may be moved back into the operative position.

In exemplary embodiments, guide element 82 may comprise plural components that converge to form guideway 84. For example, guide element 82 may comprise a pair of finger elements 88 and 90, each of which defines one-half of guideway 84. Appropriate structure is provided to cause convergence of finger elements 88 and 90 as guide element 82 is moved into the operative position.

It can thus be seen that the present invention provides various improvements in the formation and insertion of winding slot liners. While preferred embodiments of the invention have been shown and described, modifications and variations may be made thereto by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. Apparatus for forming and inserting a winding slot insulator in a winding slot defined in a stator core, said apparatus comprising:
   a reel support adapted to maintain a reel of slot insulator material having a predetermined width;
   a feed mechanism operative to deliver a quantity of said slot insulator material from said reel to a cutting station;
   a cutting mechanism located at said cutting station, said cutting mechanism operative to cut through said slot insulator material to provide an insulator blank having cuffs at respective ends thereof, said cutting mechanism being further operative to form cuffs on a trailing end of said insulator blank and a leading end of said quantity of insulator material;
   a die mechanism in which said insulator blank is received, said die mechanism being operative to form said insulator blank into a U-shaped slot insulator; and
   a transfer mechanism operative to insert said U-shaped slot insulator into said winding slot.

2. Apparatus as set forth in claim 1, further comprising a retractable guide element movable to an operative position adjacent to the winding slot, said guide element presenting a guideway through which said U-shaped slot insulator is inserted.

3. Apparatus as set forth in claim 1, wherein said die mechanism is situated in longitudinal alignment with said cutting station for receipt of said insulator blank therein.

4. Apparatus for forming and inserting a winding slot insulator in a winding slot defined in a stator core, said apparatus comprising:
   a reel support adapted to maintain a reel of slot insulator material having a predetermined width;
   a feed mechanism operative to deliver a quantity of said slot insulator material from said reel to a cutting station;
   a cutting mechanism located at said cutting station, said cutting mechanism operative to cut through said slot insulator material to provide an insulator blank having cuffs at respective ends thereof, said cutting mechanism including a cutting blade having first and second cuff pushers located on each side thereof, said cuff pushers being operative to form a respective cuff on a trailing end of said insulator blank and a leading end of said quantity of insulator material;
   a die mechanism in which said insulator blank is received, said die mechanism being operative to form said insulator blank into a U-shaped slot insulator; and
   a transfer mechanism operative to insert said U-shaped slot insulator into said winding slot.

5. Apparatus as set forth in claim 4, wherein said cutting blade and said cuff pushers are operative to move together from opposite sides of said insulator material.

6. Apparatus as set forth in claim 4, wherein said die mechanism is operative to move laterally from a first position adjacent said cutting station to a second position aligned with said winding slot.

7. Apparatus for forming and inserting a winding slot insulator in a winding slot defined in a stator core, said apparatus comprising:
   a reel support adapted to maintain a reel of slot insulator material having a predetermined width;
   a feed mechanism operative to deliver a quantity of said slot insulator material from said reel to a cutting station;
   a cutting mechanism located at said cutting station, said cutting mechanism operative to cut through said slot insulator material to provide an insulator blank having cuffs at respective ends thereof;
   a die mechanism in which said insulator blank is received, said die mechanism being operative to form said insulator blank into a U-shaped slot insulator;
   a transfer mechanism operative to insert said U-shaped slot insulator into said winding slot; and
   a retractable guide element movable to an operative position adjacent to the winding slot, said guide element presenting a guideway through which said U-shaped slot insulator is inserted, wherein said guideway of said retractable guide element is formed by plural components that converge together as said guide element is moved into said operative position.

8. Apparatus for forming and inserting a winding slot insulator in a winding slot defined in a stator core, said apparatus comprising:
   a feed mechanism operative to deliver a quantity of slot insulator material to a cutting station;
   a cutting mechanism located at said cutting station, said cutting mechanism operative to cut through said slot insulator material to provide an insulator blank having a predetermined length;
   a die mechanism in which said insulator blank is received, said die mechanism being operative to form said insulator blank into a U-shaped slot insulator;
   a transfer mechanism operative to insert said U-shaped slot insulator into said winding slot;
   a retractable guide element movable to an operative position adjacent to the winding slot, said guide element presenting a guideway through which said U-shaped slot insulator is inserted; and
   means for moving said retractable guide element into said operative position adjacent said winding slot prior to insertion of said U-shaped slot insulator and away from said winding slot after insertion of said U-shaped slot insulator therein.

9. Apparatus for forming and inserting a winding slot insulator in a winding slot defined in a stator core, said apparatus comprising:
   a feed mechanism operative to deliver a quantity of slot insulator material to a cutting station;
   a cutting mechanism located at said cutting station, said cutting mechanism operative to cut through said slot insulator material to provide an insulator blank having a predetermined length;
   a die mechanism in which said insulator blank is received, said die mechanism being operative to form said insulator blank into a U-shaped slot insulator;
   a transfer mechanism operative to insert said U-shaped slot insulator into said winding slot; and
   a retractable guide element movable to an operative position adjacent to the winding slot, said guide element presenting a guideway through which said U-shaped slot insulator is inserted, wherein said guideway of said retractable guide element is formed by plural components that converge together as said guide element is moved into said operative position.

10. Apparatus for inserting a winding slot insulator in a winding slot defined in a stator core, said apparatus comprising:

- a cutting mechanism operative to cut an insulator blank from a longitudinal strip of slot insulator material;
- a die mechanism in which said insulator blank is received, said die mechanism being operative to form said insulator blank into a U-shaped slot insulator;
- a transfer mechanism operative to insert said U-shaped slot insulator into said winding slot;
- a retractable guide element movable to an operative position adjacent to the winding slot, said guide element presenting a guideway through which said U-shaped slot insulator is inserted; and
- means for moving said retractable guide element into said operative position adjacent said winding slot prior to insertion of said U-shaped slot insulator and away from said winding slot after insertion of said U-shaped slot insulator therein.

11. Apparatus for inserting a winding slot insulator in a winding slot defined in a stator core, said apparatus comprising:

- a cutting mechanism operative to cut an insulator blank from a longitudinal strip of slot insulator material;
- a die mechanism in which said insulator blank is received, said die mechanism being operative to form said insulator blank into a U-shaped slot insulator;
- a transfer mechanism operative to insert said U-shaped slot insulator into said winding slot; and
- a retractable guide element movable to an operative position adjacent to the winding slot, said guide element presenting a guideway through which said U-shaped slot insulator is inserted, wherein said guideway of said retractable guide element is formed by plural components that converge together as said guide element is moved into said operative position.

12. Apparatus as set forth in claim 11, wherein said die mechanism is operative to move laterally from a first position at which said insulator blank is received to a second position aligned with said winding slot.

* * * * *